(12) United States Patent
Zhou et al.

(10) Patent No.: US 11,647,571 B2
(45) Date of Patent: May 9, 2023

(54) PRE-CHARGING CONTROL METHOD OF POWER MODULE AND POWER MODULE

(71) Applicant: Delta Electronics (Shanghai) Co., Ltd., Shanghai (CN)

(72) Inventors: Chaobo Zhou, Shanghai (CN); Xinghua Zhang, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/447,696

(22) Filed: Sep. 15, 2021

(65) Prior Publication Data

US 2022/0159804 A1 May 19, 2022

(30) Foreign Application Priority Data

Nov. 18, 2020 (CN) .......................... 202011295264.6

(51) Int. Cl.
*H05B 45/325* (2020.01)
*H05B 45/10* (2020.01)

(52) U.S. Cl.
CPC ........... *H05B 45/325* (2020.01); *H05B 45/10* (2020.01)

(58) Field of Classification Search
CPC .... H05B 45/325; H05B 45/10; H05B 45/375; H05B 45/59; H05B 45/40; H02M 1/00; H02M 1/36; H02J 7/00714; H02J 7/007182; H02J 7/345; H02J 2207/50
See application file for complete search history.

(56) References Cited

U.S. PATENT DOCUMENTS

| | | | |
|---|---|---|---|
| 8,492,987 B2* | 7/2013 | Nuhfer | H05B 45/10 315/246 |
| 2011/0085576 A1* | 4/2011 | Crawford | H05B 45/38 372/38.07 |
| 2018/0249543 A1* | 8/2018 | Kober | H05B 45/3725 |

FOREIGN PATENT DOCUMENTS

| CN | 102105957 B | 3/2013 |
|---|---|---|
| CN | 110545605 A | 12/2019 |

\* cited by examiner

*Primary Examiner* — Renan Luque
(74) *Attorney, Agent, or Firm* — CKC & Partners Co., LLC (57) ABSTRACT

The present application provides a pre-charging control method of a power module and a power module. By configuring the power module to pre-charge an output capacitor according to a preset mode, the output capacitor voltage reaches a pre-charging target voltage so as to make the load conduct and the load begins to operate normally. The preset mode includes: pre-charging the output capacitor with a first preset current in a first stage, pre-charging the output capacitor with a second preset current in a second stage, and pre-charging the output capacitor with a third preset current in a third stage. The first preset current is less than the second preset current, and the third preset current is less than the second preset current.

15 Claims, 5 Drawing Sheets

PRE-CHARGING CONTROL METHOD OF POWER MODULE AND POWER MODULE

CROSS-REFERENCE TO RELATED APPLICATIONS

This application claims priority to Chinese Patent Application No. 202011295264.6, filed on Nov. 18, 2020, and entitled "PRE-CHARGING CONTROL METHOD OF POWER MODULE AND POWER MODULE", the content of which is hereby incorporated by reference in its entirety.

TECHNICAL FIELD

The present application relates to the field of control technology, and in particular, to a pre-charging control method of a power module and a power module.

BACKGROUND

For a light-emitting diode (LED) load, an LED is lit only when the voltage across two ends of the LED is greater than its threshold voltage according to the volt-ampere characteristics.

Generally, in order to achieve a high power output with small current ripples for a power supply device, a large output capacitor is usually connected in parallel at the output end of the power supply device. And when the power supply device is powered on for the first time, it usually starts with a small current. However, due to the existence of the output capacitor, it usually takes a long charging time to make the output capacitor voltage reach the threshold voltage when the power supply device starts with a small current. A long starting time may cause the starting process of load not to meet a preset protocol (such as DALI dimming protocol), and there are some security risks.

In order to shorten the starting time, a large starting current may be provided. However, the larger current will cause signal fluctuation of the LED load. For example, the LED will flicker irregularly when it is lit. This signal fluctuation will affect the normal use of the load and seriously affect user experience.

SUMMARY

The present application provides a pre-charging control method of a power module and a power module, to solve the technical problem that the pre-charging control process of LED load in the prior art may cause the starting process not to meet the preset protocol, and signal fluctuation may occur to cause poor use experience of users.

In a first aspect, the present application provides a pre-charging control method of a power module. Wherein, an output end of the power module is connected with an output capacitor and an LED load, and the LED load is connected in parallel with the output capacitor. The method includes: configuring the power module to pre-charge the output capacitor according to a preset mode, so that an output capacitor voltage reaches a pre-charging target voltage, where the pre-charging target voltage is used to make the LED load conduct. The preset mode includes: pre-charging the output capacitor with a first preset current in a first stage, pre-charging the output capacitor with a second preset current in a second stage, and pre-charging the output capacitor with a third preset current in a third stage. Wherein, the first preset current is less than the second preset current, and the third preset current is less than the second preset current.

In a second aspect, the present application provides a pre-charging control method of a power module. Wherein, an output end of the power module is connected with an output capacitor and an LED load, and the LED load is connected in parallel with the output capacitor. The method includes: configuring the power module to pre-charge the output capacitor according to a preset mode, so that an output capacitor voltage reaches the pre-charging target voltage, and the pre-charging target voltage is used to make the LED load conduct. The preset mode includes: pre-charging the output capacitor with a first preset current in a first stage, and pre-charging the output capacitor with a second preset current in a second stage, wherein the first preset current is greater than the second preset current.

In a third aspect, the present application provides a power module. The power module comprises a power unit and a control unit. An output end of the power unit being connected with an output capacitor and an LED load, and the LED load being connected in parallel with the output capacitor. The control unit is electrically connected to the power unit for controlling the power unit to supply power to the LED load, where the control unit is configured to perform the pre-charging control method of the power module according to any one of the first aspect and the optional solutions of the first aspect and the second aspect and the optional solutions of the second aspect.

In the pre-charging control method of the power module and the power module provided by the present application, the power module is configured to pre-charge the output capacitor according to the preset mode, so that the output capacitor voltage reaches the pre-charging target voltage, so as to make the LED load conduct through the pre-charging target voltage, to make the LED begin to operate normally. The output capacitor is pre-charged with the first preset current in the first stage, the output capacitor is pre-charged with the second preset current in the second stage, and the output capacitor is pre-charged with the third preset current in the third stage. The first preset current is less than the second preset current, and the third preset current is less than the second preset current. The output capacitor is pre-charged by stages and different currents according to the preset mode, so as to make the output capacitor voltage reach the pre-charging target voltage required by the LED conduction, so that the starting process of the LED not only meets the preset protocol, but also does not have the problem of poor use experience of users caused by signal fluctuation, thus enhancing use experience of users.

BRIEF DESCRIPTION OF DRAWINGS

In order to illustrate the technical solutions in the embodiments of the present application or the prior art more clearly, the drawings to be used in the description of the embodiments or the prior art will be briefly introduced in the following. It is obvious that the drawings in the following description are some embodiments of the present application. For those skilled in the art, other figures may also be obtained according to these figures without paying creative effort.

DESCRIPTION OF EMBODIMENTS

Here, illustrative embodiments will be described in detail, examples of which are shown in the accompanying drawings. When the following description relates to the drawings, unless otherwise indicated, the same numbers in different drawings indicate the same or similar elements. The embodiments described in the following illustrative embodiments do not represent all embodiments consistent with the present application. Instead, they are only examples of methods and devices consistent with some aspects of the present application as detailed in the appended claims.

The terms "first", "second", "third", "fourth" and the like (if any) in the description and claims of the present application and the above drawings are used to distinguish similar objects, and need not be used to describe a specific order or sequence. It should be understood that data so used can be interchanged where appropriate so that the embodiments of the present application described herein can be implemented, for example, in a sequence other than those illustrated or described herein. In addition, the terms "include" and "have" and any variation of them are intended to cover non-exclusive inclusion. For example, a process, method, system, product or device that contains a series of steps or units needs not be limited to those steps or units that are clearly listed, but may include other steps or units that are not clearly listed or inherent to the process, method, product or device.

The embodiments of the present application provide a pre-charging control method of a power module and a power module. The power module is configured to pre-charge an LED load according to a preset mode to make an output capacitor voltage reach a pre-charging target voltage. The process of pre-charging, that is, the starting process of the LED load, is divided into different stages, and in each stage, the output is pre-charged according to a different preset current, so that the starting process of the LED not only meets a preset protocol, but also does not have the problem of poor user experience caused by signal fluctuation, thus improving the use experience of users.

Further, an illustrative application scenario of an embodiment of the present application will be introduced.

Figure 1:
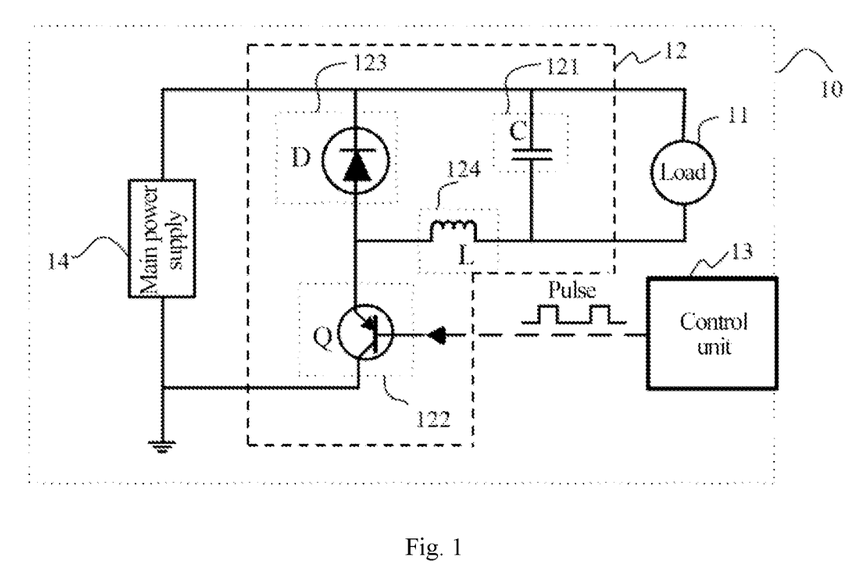
FIG. 1 is a schematic structural diagram of a power module provided by an embodiment of the present application.

FIG. 1 is a schematic structural diagram of a power module provided by an embodiment of the present application. As illustrated in FIG. 1, the pre-charging control method provided by the embodiment of the present application can be applied to the power module 10 of the load 11. The power module 10 includes a power unit 12 and a control unit 13, where an input end of the power unit 12 is connected with a main power supply 14 to receive an input voltage, and an output end of the power unit 12 is connected with the load 11, and the control unit 13 is connected with the power unit 12 to control the power unit 12 to supply power to the load 11. In FIG. 1, the load 11 is shown for example as an LED, and the load 11 may also be other loads facing the same problems as the present application in the starting process, which is not limited in the present embodiment. Further, referring to FIG. 1, the output end of the power unit 12 is connected with an output capacitor 121, and the load 11 is connected in parallel with the output capacitor 121. The existence of the output capacitor (C) 121 will result the starting problem of the load 11, and then the problem to be solved by the present application appears. Based on this, the pre-charging control method of the power module provided by the embodiments of the present application can be implemented by the control unit 13 which can output a PWM signal to control the power unit 12. The control unit 13 may be a digital processor such as an MCU (micro controller unit), a DSP (digital signal processing) to implement the pre-charging control method provided by the embodiment of the present application by executing corresponding instructions or computer programs, and the control unit 13 may also be implemented by an analog circuit. The power unit 12 in FIG. 1 adopts Buck architecture, including the output capacitor (C) 121, a switch (Q) 122, a diode (D) 123 and an inductor module (L) 124. The power unit 12 in FIG. 1 provided by the embodiment of the present application includes but is not limited to the Buck architecture. In other embodiments, other topologies may also be used.

It should be noted that the above application scenario of the power module is only illustrative, and the pre-charging control method provided by the embodiments of the present application includes but is not limited to the above present application scenario.

The technical solution of the present application and how the technical solution of the present application solves the above technical problems are described in detail with specific embodiments. The following specific embodiments may be combined with each other, and the same or similar concepts or processes may not be repeated in some embodiments. The following will describe the embodiments of the present application in combination with the drawings.

Figure 2:
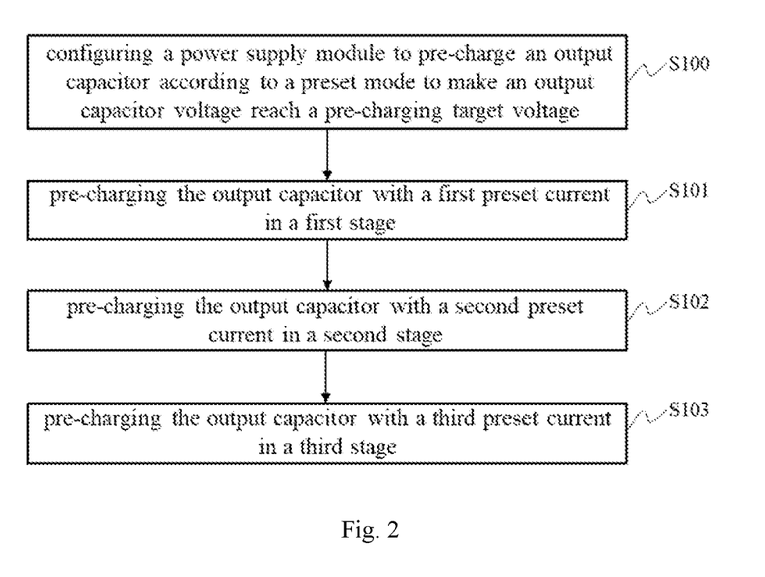
FIG. 2 is a schematic flow diagram of a pre-charging control method provided by an embodiment of the present application.

FIG. 2 is a schematic flow diagram of a pre-charging control method provided by an embodiment of the present application. As illustrated in FIG. 2, the pre-charging control method of the embodiment includes:

S100: configuring a power module to pre-charge an output capacitor according to a preset mode to make an output capacitor voltage reach a pre-charging target voltage.

Wherein, the pre-charging target voltage is used to make the load conduct.

The preset mode includes:

S101: pre-charging the output capacitor with a first preset current in a first stage;

S102: pre-charging the output capacitor with a second preset current in a second stage;

S103: pre-charging the output capacitor with a third preset current in a third stage.

Wherein, the first preset current is less than the second preset current, and the third preset current is less than the second preset current.

The power module is configured so that it pre-charges the output capacitor which is connected in parallel with the load according to the preset mode. The pre-charging process continues until the output capacitor voltage reaches the pre-charging target voltage, so as to make the load conduct through the pre-charging target voltage and then, the start of the load is completed. The load may be an LED load.

The preset mode may be divided the pre-charge process into three stages: the first stage, the second stage and the third stage in turn. The output capacitor is pre-charged with the first preset current, the second preset current and the third preset current in the three stages, respectively, until the output capacitor voltage reaches a voltage which can make the load conduct, i.e., the pre-charging target voltage.

The first preset current is less than the second preset current, and the third preset current is less than the second preset current. Therefore, in the three stages, the period of time required for the second stage is longer than that in the first stage and the second stage. In other words, in the second stage, the output capacitor may be pre-charged by a large current, thereby greatly shortening the whole pre-charging process and making the starting process of the load meet the preset protocol.

On the other hand, the first preset current is less than the second preset current and the third preset current is less than the second preset current, the starting process of the load will be smooth without signal fluctuation. Specifically, in the first stage, since the load has just been powered on and then started to be pre-charged, the whole circuit is not stable, if the load is pre-charged with a large current, it will cause over stress of some components in the circuit. In the third stage, the output capacitor voltage is about to reach the pre-charge target voltage, that is, the load is about to switch to the normal operation state after being conducted. In order not to affect the use experience, signal fluctuation should be avoided, so the third preset current may be set to a corresponding value less than the second preset current.

The first preset current and the third preset current may or may not be equal. In order to make the pre-charging control process easier, the first preset current may be set equal to the third preset current.

Wherein, the first preset current in the first stage, the second preset current in the second stage and the third preset current in the third stage do not require that each preset current in each stage is a fixed current value, and the preset current in each stage may fluctuate slightly. For example, it can be considered that each stage may be divided into several sub-stages, and in each sub-stage, the load may be charged with a current having the same or different value, and this scheme also falls within the protection scope of the present application, as long as the average value of the second preset current in the second stage is greater than the average values of the first stage and the second stage.

Furthermore, in order to achieve the purpose of the pre-charge control method provided by the embodiment of the present application more effectively, that is, to greatly shorten the period of time for the load to be conducted while no signal fluctuation appears and use experience is not affected, in a possible implementation, the first preset current and the third preset current may be set as the minimum output current of the power module in normal operation, so that when the load is started, there is no need to switch current, and then there will be no signal fluctuation. Further, the second preset current is set to the maximum output current of the power module in normal operation, so as to shorten the period of time for the load to be pre-charged to the greatest extent. There, the problem of signal fluctuation caused in the prior art is overcome.

Wherein, the specific corresponding values of the maximum output current and the minimum output current of the power module in normal operation will be determined according to the load and the power module in actual working conditions, which is not limited in the embodiment of the present application. For example, the minimum output current is 0.1% of the rated current of the power module, and the maximum output current is 100% of the rated current of the power module.

The preset protocol described in the above embodiment may be a corresponding protocol that needs to be met when the load is started, such as DALI dimming protocol, which requires the LED to be lit within 100 ms. The specific content involved in the preset protocol may be determined according to the specific control operation of the load, which is not limited in the embodiment of the present application. In addition, parameters, such as specific specifications, types, of the power module may also be set according to actual working conditions, which is not limited in the embodiment of this present application.

The pre-charge control method provided by the embodiment of the present application configures the power module to pre-charge the output capacitor connected in parallel with the load according to the preset mode, so that the output capacitor voltage reaches the pre-charge target voltage, so as to make the load be conducted through the pre-charge target voltage, to make the load begin to operate normally. The preset mode is to pre-charge the output capacitor with the first preset current in the first stage, pre-charge the output capacitor with the second preset current in the second stage and pre-charge the output capacitor with the third preset current in the third stage. The first preset current is less than the second preset current, and the third preset current is less than the second preset current. The output capacitor is pre-charged by different currents according to the preset mode until the output capacitor voltage reaches the pre-charging target voltage, which greatly shortens the period of time for the load to become conducting, so that the starting process not only meets the preset protocol, but also does not have the problem of poor user experience caused by signal fluctuation, which effectively improves users' experience for the load.

Figure 3:
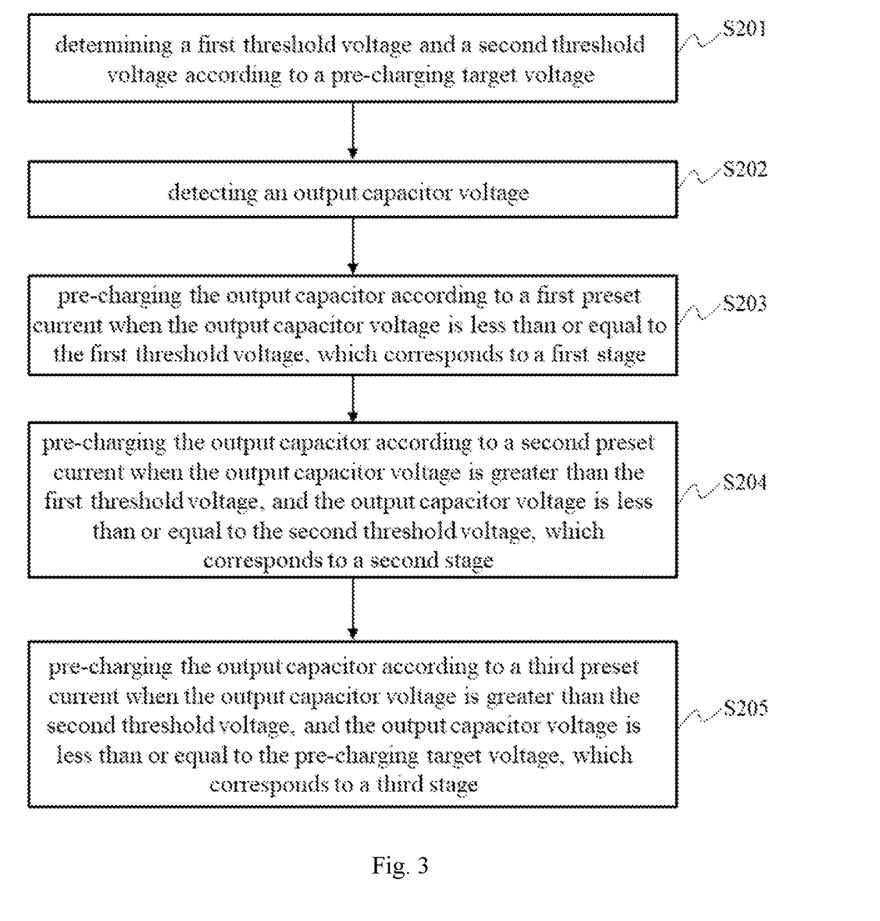
FIG. 3 is a schematic flow diagram of another pre-charging control method provided by an embodiment of the present application.

FIG. 3 is a schematic flow diagram of another pre-charge control method provided by an embodiment of the present application. As illustrated in FIG. 3, the pre-charge control method provided by the embodiment includes:

S201: determining a first threshold voltage and a second threshold voltage according to a pre-charging target voltage.

The first threshold voltage is less than the second threshold voltage, and the second threshold voltage is less than the pre-charging target voltage.

For a load, the pre-charge target voltage to make the load conduct is a specific voltage value. In the process of pre-charging according to the preset mode, the voltage to reach in different stages is determined firstly, that is, the first threshold voltage and the second threshold voltage are determined according to the pre-charging target voltage. The first threshold voltage, the second threshold voltage and the pre-charging target voltage are voltage values which the output capacitor voltage reaches in turn in the process of pre-charging the output capacitor. Therefore, the first threshold voltage is less than the second threshold voltage, and the second threshold voltage is less than the pre-charging target voltage.

In some embodiments, voltage values corresponding to certain proportions of the pre-charging target voltage may be set as the first threshold voltage and the second threshold voltage. For example, the first threshold voltage is set equal to 0.1 times the pre-charging target voltage, and correspondingly, the second threshold voltage is set equal to 0.9 times the pre-charging target voltage. Wherein, the exact proportions for setting the voltage values of the first threshold voltage and the second threshold voltage may be determined according to the specific situation of the load and the corresponding pre-charging target voltage in actual working conditions. The proportions include but are not limited to 0.1 times and 0.9 times listed above.

S202: detecting an output capacitor voltage.

In step S202, output capacitor voltage may be sampled. For example, the voltage across the two ends of the output capacitor may be sampled in real time through a voltage sampling circuit. Due to the load and the output capacitor are connected in parallel, the voltage on the load is the output capacitor voltage across the two ends of the output capacitor, which may also be implemented by sampling the voltage on the load through the voltage sampling circuit.

S203: pre-charging the output capacitor according to a first preset current when the output capacitor voltage is less than or equal to the first threshold voltage, which corresponds to a first stage.

S204: pre-charging the output capacitor according to a second preset current when the output capacitor voltage is greater than the first threshold voltage, and the output capacitor voltage is less than or equal to the second threshold voltage, which corresponds to a second stage.

S205: pre-charging the output capacitor according to a third preset current when the output capacitor voltage is greater than the second threshold voltage, and the output capacitor voltage is less than or equal to the pre-charging target voltage, which corresponds to a third stage.

The specific voltage values corresponding to the first threshold voltage and the second threshold voltage are determined according to the pre-charging target voltage. Correspondingly, in actual working conditions, the pre-charging process may be divided into different stages, such as the first stage, the second stage and the third stage, by sampling the output capacitor voltage.

As illustrated in step S203 to step S205, the process of starting to power on the load until the output capacitor voltage reaches the first threshold voltage is the first stage. In other words, the corresponding period of time when the output capacitor voltage is less than or equal to the first threshold voltage can be determined as the first stage, and the output capacitor can be pre-charged according to the first preset current in the first stage.

After the output capacitor voltage reaches the first threshold voltage, the output capacitor voltage further continues to be sampled, and the output capacitor voltage rises from the first threshold voltage to the second threshold voltage, which is the second stage. In other words, the corresponding period of time when the output capacitor voltage is greater than the second threshold voltage and less than or equal to the second threshold voltage can be determined as the second stage, and the output capacitor can be pre-charged according to the second preset current in the second stage.

After the output capacitor voltage reaches the second threshold voltage, the output capacitor voltage further continues to be sampled. The process of the output capacitor voltage rising from the second threshold voltage to the pre-charging target voltage is the third stage. In other words, the corresponding period of time when the output capacitor voltage is greater than the second threshold voltage and less than or equal to the pre-charging target voltage can be determined as the third stage, and the output capacitor can be pre-charged according to the third preset current in the third stage until the load conducts.

Figure 4:
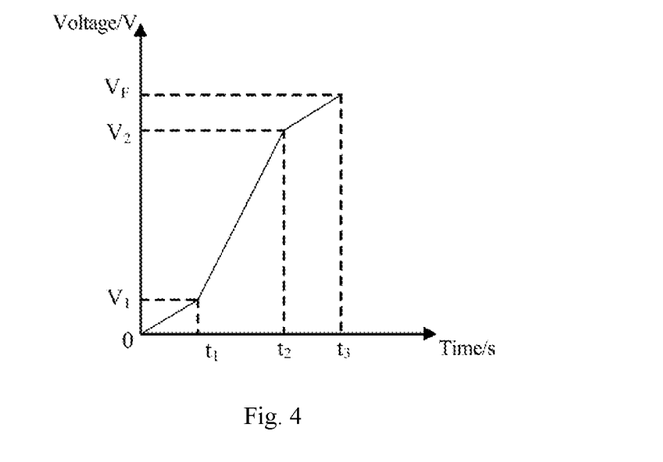
FIG. 4 provides a schematic diagram of voltage change for an embodiment of the present application.

FIG. 4 provides a schematic diagram of voltage change for an embodiment of the present application. As illustrated in FIG. 4, the process of the output capacitor voltage from the starting of 0 to the first threshold voltage ($V_1$) is the first stage ($0{\sim}t_1$), the process from the first threshold voltage ($V_1$) to the second threshold voltage ($V_2$) is the second stage ($t_1{\sim}t_2$), and the process from the second threshold voltage ($V_2$) to the pre-charging target voltage ($V_F$) is the third stage ($t_2{\sim}t_3$).

In the above embodiment, the first threshold voltage and the second threshold voltage are determined according to the pre-charging target voltage, and the first stage, the second stage and the third stage are determined in turn. In other embodiments, the pre-charging control may be implemented by timing. Specifically, a first preset period, a second preset period and a third preset period may be set according to the pre-charging target voltage. The first preset period is the first stage, and the output capacitor is pre-charged with the first preset current within the first preset period. Accordingly, the second preset period is the second stage, and the output capacitor is pre-charged with the second preset current within the second preset period. Then, the third preset period is the third stage, and the output capacitor is pre-charged with the third preset current within the third preset period. When the timing mode is used, the first preset period, the second preset period and the third preset period may be set according to the first threshold voltage ($V_1$) and the second threshold voltage ($V_2$). The first preset period, the second preset period and the third preset period may also be set according to actual situations, that is, the per-charging is performed with the first preset current within the first period, but the voltage at the end of the first preset period is not necessarily equal to the first threshold voltage ($V_1$), and the per-charging is performed with the second preset current within the second period, but the voltage at the end of the second preset period is not necessarily equal to the second threshold voltage ($V_2$). The present embodiment is not limited thereto.

Figure 5:
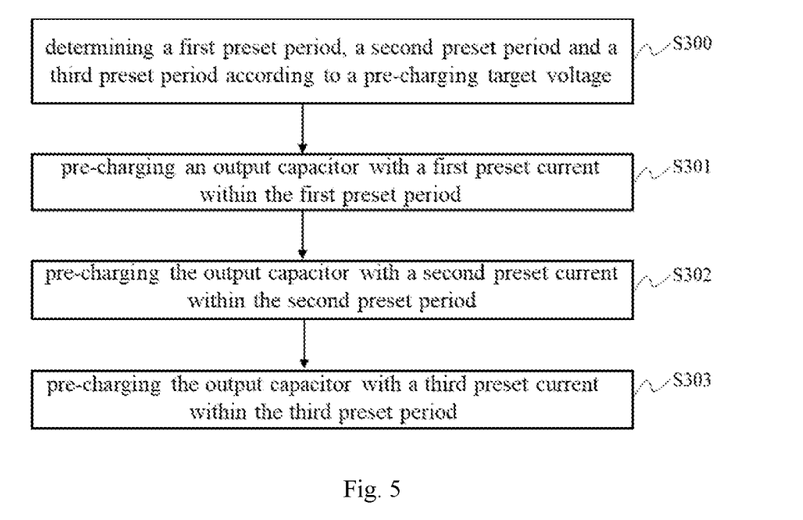
FIG. 5 is a schematic flow diagram of still another pre-charging control method provided by an embodiment of the present application.
Figure 6:
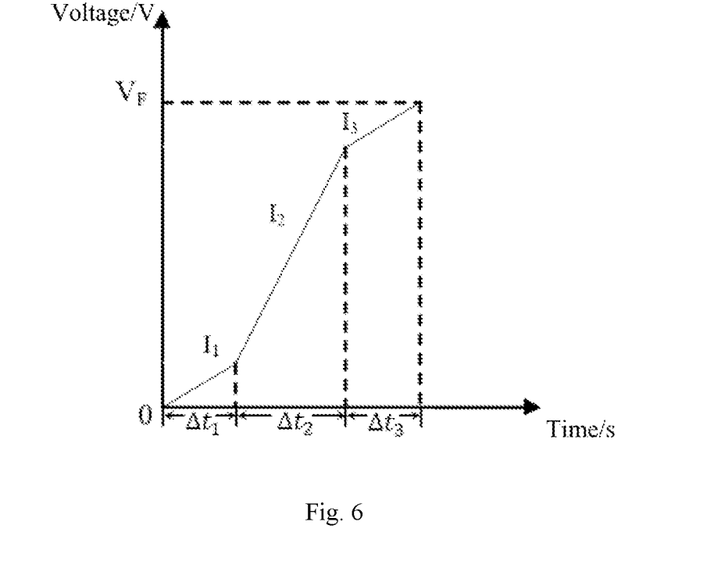
FIG. 6 is another schematic diagram of voltage change provided by an embodiment of the present application.

When the pre-charging control is implemented by the above timing method, the output capacitor voltage does not need to be sampled, and the control unit implements the pre-charging control according to the preset periods and output current. Specifically, the control flow and the output capacitor voltage are shown in FIG. 5 and FIG. 6, respectively. FIG. 5 is a schematic flow diagram of another pre-charging control method provided by an embodiment of the present application, and FIG. 6 is another schematic diagram of voltage change provided by the embodiment of the present application. As illustrated in FIG. 5, the pre-charging control method provided by this embodiment includes:

S300: determining a first preset period, a second preset period and a third preset period according to a pre-charging target voltage;

S301: pre-charging an output capacitor with a first preset current within the first preset period;

S302: pre-charging the output capacitor with a second preset current within the second preset period;

S303: pre-charging the output capacitor with a third preset current within the third preset period.

Referring to FIG. 5 and FIG. 6, the output capacitor is pre-charged by the first preset current ($I_1$) within the first preset period ($\Delta t_1$), the output capacitor is pre-charged by the second preset current ($I_2$) within the second preset period ($\Delta t_2$), and the output capacitor is pre-charged by the third preset current ($I_3$) within the third preset period ($\Delta t_3$). In order to make the starting process of the load meet the preset protocol and have good user experience, in other words, in order to ensure that the load conducted quickly and smoothly, the first preset current ($I_1$) is equal to the third preset current ($I_3$) and is the minimum output current ($I_{min}$) of the power module, while the second preset current ($i_2$) is set to the maximum output current ($I_{max}$) of the power module.

In an embodiment, the output capacitor is pre-charged within the first preset period ($\Delta t_1$) so that the output capacitor voltage reaches the first threshold voltage ($V_1$). Then, the output capacitor is further pre-charged within the second preset period ($\Delta t_2$) so that the output capacitor voltage reaches the second threshold voltage ($V_2$). The output capacitor continues to be pre-charged within the third preset period ($\Delta t_3$) so that the output capacitor voltage reaches the pre-charging target voltage ($V_F$).

Wherein, the first preset period, the second preset period and the third preset period illustrated in the above embodiments, as well as the voltages to reach for respective periods of time in the pre-charging process, are all illustrative. In actual working conditions, they can be set according to specific conditions of the load and the power module, which is not limited in the embodiments of the present application.

Figure 7:
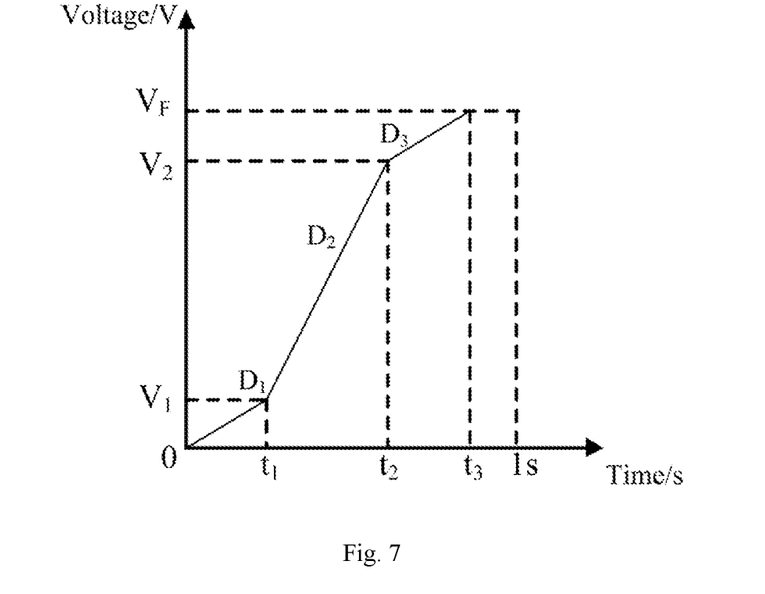
FIG. 7 is still another schematic diagram of voltage change provided by an embodiment of the present application.

In some embodiments, the pre-charging control of the load is implemented by controlling the on/off of the switch Q in the power unit. Specifically, the output capacitor voltage during the control process is as shown in FIG. 7. FIG. 7 is another schematic diagram of voltage change provided by an embodiment of the present application. As illustrated in FIG. 7, a first driving signal (D1) is applied to the power module in a first stage (0~$t_1$), and the first driving signal (D1) is a driving signal for controlling the switch Q in first stage. In a second stage ($t_1$~$t_2$), a second driving signal (D2) is applied to the power module, and the second driving signal (D2) is a driving signal for controlling the switch Q in second stage. In a third stage ($t_2$~$t_3$), a third driving signal (D3) is applied to the power module, and the third driving signal (D3) is a driving signal for controlling the switch Q in third stage. The duty cycle of the first drive signal (D1) is less than that of the second drive signal (D2), and the duty cycle of the third drive signal (D3) is less than that of the second drive signal (D2).

As illustrated in FIG. 7, in order to make the starting process of the load meet the preset protocol and have good user experience, that is, in order to ensure that the load becomes conducting quickly and smoothly, the first driving signal (D1) and/or the third driving signal (D3) may be set as the minimum drive signal ($D_{min}$) required by the power module to drive the load to operate, and the second drive signal (D2) may be set as the maximum drive signal ($D_{max}$) required by the power module to drive the load to operate. Through the pre-charging control method provided by the embodiment of the present application, the pre-charge time can be shortened to less than 1 s.

Wherein, the specific duty cycles corresponding to the first driving signal, the second driving signal and the third driving signal listed in the above embodiments may be set according to specific conditions of the load and the power module in actual working conditions, which is not limited in the embodiments of the present application.

Figure 8:
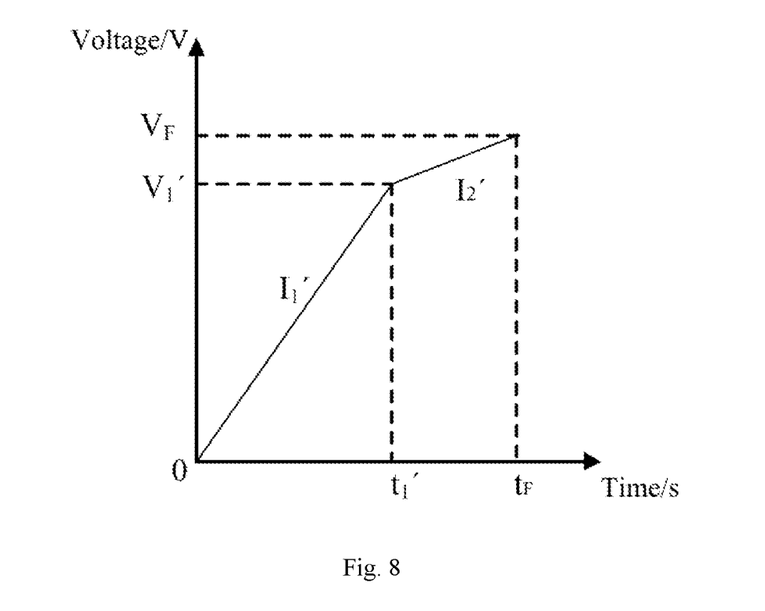
FIG. 8 is yet another schematic diagram of voltage change provided by another embodiment of the present application.

In some embodiments, the first stage in the above embodiments may be omitted, that is, the power module is configured with two stages to pre-charge the output capacitor. FIG. 8 is still another schematic diagram of voltage change provided by an embodiment of the present application. As illustrated in FIG. 8, the pre-charging process is divided into two stages. In the first stage (0~$t_1$'), the output capacitor is pre-charged with the first preset current, and in the second stage ($t_1$'~$t_F$), the output capacitor is pre-charged with the second preset current. The first preset current is greater than the second preset current. In this embodiment, the first stage ensures a large pre-charging current, thereby greatly shortening the whole pre-charging time to meet the preset protocol. In the second stage, when the output capacitor voltage is about to reach the pre-charging target voltage, that is, the load will switch to the normal operation state after becoming conducting, in order not to affect use experience, signal fluctuation should be avoided, so the second preset current should be set smaller.

Specifically, as illustrated in FIG. 8, a threshold voltage $V_1$' is set according to the pre-charging target voltage $V_F$, and the output capacitor voltage is detected. When the output capacitor voltage is less than or equal to the threshold voltage $V_1$', which corresponds to a first stage, the output capacitor is pre-charged according to the first preset current (e.g., $I_1$'). When the output capacitor voltage is greater than the threshold voltage $V_1$', which corresponds to the second stage, the output capacitor is pre-charge according to the second preset current (e.g., $I_2$'). The first preset current (e.g., $I_1$') is greater than the second preset current (e.g., $I_2$').

Figure 9:
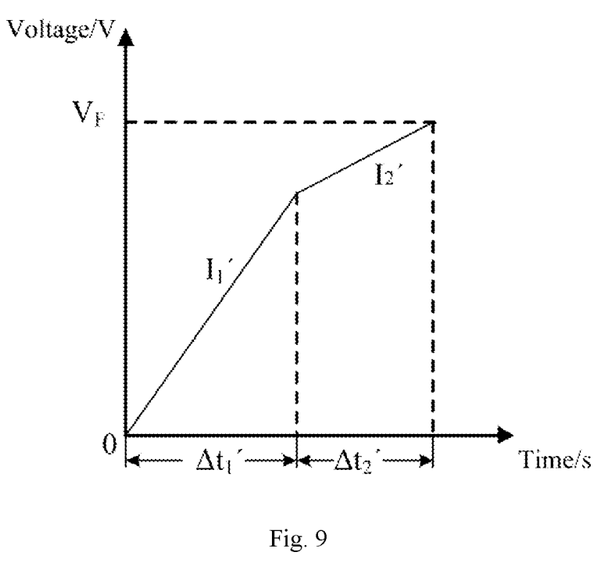
FIG. 9 is yet another schematic diagram of voltage change provided by another embodiment of the present application.

FIG. 9 is another schematic diagram of voltage change provided by an embodiment of the present application. As illustrated in FIG. 9, a preset period (e.g., $\Delta t_1$') is set according to the pre-charge target voltage, and the preset period is the first stage, and the output capacitor is pre-charged with the first preset current. When exceeding the preset time (for example, within $\Delta t_2$'), which corresponds to the second stage, the output capacitor is pre-charged with the second preset current.

Similarly, the first preset current may be the maximum output current of the power module in normal operation, and the second preset current may be the minimum output current of the power module in normal operation.

The preset current in the above two stages does not require that the preset current in each stage is a fixed current value, and the preset current in each stage may fluctuate slightly. For example, it may be considered that each stage may be divided into several sub-stages, and in each sub-stage, charging current may be performed with the same or different current value. This scheme also falls within the protection scope of this application. In this embodiment, as long as the average value of the second preset current in the second stage is less than the average value of the first stage.

Those skilled in the art will easily think of other embodiments of the present application after considering the description and practicing the present application disclosed herein. The present application is intended to cover any variations, uses or adaptations of the present application, which follow the general principles of the present application and include common general knowledge or conventional technical means in the art not disclosed by the present application. The description and the embodiments are only regarded as illustrative, and the true scope and spirit of the present application are indicated by the claims.

It should be understood that the present application is not limited to the precise structure described above and shown in the drawings, and various modifications and changes may be made without departing from its scope. The scope of the present application is limited only by the appended claims.

What is claimed is:

1. A pre-charging control method of a power module, an output end of the power module being connected with an output capacitor and an LED (Light Emitting Diode) load, and the LED load being connected in parallel with the output capacitor, comprising:

configuring the power module to pre-charge the output capacitor according to a preset mode, so that an output capacitor voltage reaches a pre-charging target voltage which is used to make the LED load conduct;

the preset mode including: pre-charging the output capacitor with a first preset current in a first stage, pre-charging the output capacitor with a second preset current in a second stage, and pre-charging the output capacitor with a third preset current in a third stage;

wherein the first preset current is less than the second preset current, and the third preset current is less than the second preset current.

2. The pre-charging control method of the power module according to claim 1, comprising:

determining a first threshold voltage and a second threshold voltage according to the pre-charging target voltage; wherein, the first threshold voltage is less than the second threshold voltage, and the second threshold voltage is less than the pre-charging target voltage;

detecting the output capacitor voltage;

pre-charging the output capacitor according to the first preset current when the output capacitor voltage is less than or equal to the first threshold voltage, which corresponds to the first stage;

pre-charging the output capacitor according to the second preset current when the output capacitor voltage is greater than the first threshold voltage and less than or equal to the second threshold voltage, which corresponds to the second stage;

pre-charging the output capacitor according to the third preset current when the output capacitor voltage is greater than the second threshold voltage and less than or equal to the pre-charging target voltage, which corresponds to the third stage.

3. The pre-charging control method of the power module according to claim 1, wherein the first preset current is equal to the third preset current.

4. The pre-charging control method of the power module according to claim 3, wherein the first preset current and the third preset current are a minimum output current of the power module in normal operation, and the second preset current is a maximum output current of the power module in normal operation.

5. The pre-charging control method of the power module according to claim 2, wherein, the first threshold voltage is set equal to 0.1 times the pre-charging target voltage;

the second threshold voltage is set equal to 0.9 times the pre-charging target voltage.

6. The pre-charging control method of the power module according to claim 1, wherein a first preset period, a second preset period and a third preset period are determined according to the pre-charging target voltage;

wherein the output capacitor is pre-charged with the first preset current within the first preset period, which corresponds to the first stage;

the output capacitor is pre-charged with the second preset current within the second preset period, which corresponds to the second stage;

the output capacitor is pre-charged with the third preset current within the third preset period, which corresponds to the third stage.

7. The pre-charging control method of the power module according to claim 6, wherein, the output capacitor is pre-charged within the first preset period to make the output capacitor voltage reach a first threshold voltage;

the output capacitor is further pre-charged within the second preset period to make the output capacitor voltage reach a second threshold voltage; and the output capacitor is further pre-charged within the third preset period to make the output capacitor voltage reach the pre-charging target voltage.

8. The pre-charging control method of the power module according to claim 1, wherein, a first driving signal is applied to the power module in the first stage;

a second driving signal is applied to the power module in the second stage;

a third driving signal is applied to the power module in the third stage;

wherein a duty cycle of the first driving signal is less than a duty cycle of the second driving signal, and a duty cycle of the third driving signal is less than the duty cycle of the second driving signal.

9. The pre-charging control method of the power module according to claim 8, wherein the first driving signal and/or the third driving signal are a minimum driving signal for the power module to drive the LED load, and the second driving signal is a maximum driving signal for the power module to drive the LED load.

10. A pre-charging control method of a power module, an output end of the power module being connected with an output capacitor and an LED load, and the LED load being connected in parallel with the output capacitor, wherein the method comprises:

configuring the power module to pre-charge the output capacitor according to a preset mode, so that an output capacitor voltage reaches a pre-charging target voltage, wherein the pre-charging target voltage is used to make the LED load conduct;

the preset mode including: pre-charging the output capacitor with a first preset current in a first stage, and pre-charging the output capacitor with a second preset current in a second stage;

wherein the first preset current is greater than the second preset current, and the first preset current and the second preset current are fixed current values.

11. The pre-charging control method of the power module according to claim 10, wherein a threshold voltage is determined according to the pre-charging target voltage;

the output capacitor voltage is collected;

wherein the output capacitor is pre-charged according to the first preset current when the output capacitor voltage is less than or equal to the threshold voltage, which corresponds to the first stage;

the output capacitor is pre-charged according to the second preset current when the output capacitor voltage is greater than the threshold voltage, which corresponds to the second stage.

12. The pre-charging control method of the power module according to claim 10, wherein a preset period of time is determined according to the pre-charging target voltage; wherein, the output capacitor is pre-charged with the first preset current within the preset period of time which is the first stage; and the output capacitor is pre-charged with the second preset current when the preset period of time is exceeded which corresponds to the second stage.

13. The pre-charging control method of the power module according to claim 11, wherein the first preset current is a maximum output current of the power module when in normal operation, and the second preset current is a minimum output current of the power module when in the normal operation.

14. A power module, comprising:
- a power unit, an output end of the power unit being connected with an output capacitor and an LED load, and the LED load being connected in parallel with the output capacitor; and
- a control unit, electrically connected to the power unit for controlling the power unit to supply power to the LED load, wherein the control unit is configured to perform the pre-charging control method of the power module according to claim 1.

15. A power module, comprising:
- a power unit, an output end of the power unit being connected with an output capacitor and an LED load, and the LED load being connected in parallel with the output capacitor; and
- a control unit, electrically connected to the power unit for controlling the power unit to supply power to the LED load, wherein the control unit is configured to perform the pre-charging control method of the power module according to claim 10.

* * * * *